United States Patent
Janakiraman et al.

(10) Patent No.: US 7,360,149 B2
(45) Date of Patent: Apr. 15, 2008

(54) DISPLAYING TEXT OF VIDEO IN BROWSERS ON A FRAME BY FRAME BASIS

(75) Inventors: Janani Janakiraman, Austin, TX (US); Rabindranath Dutta, Austin, TX (US); Richard Scott Schwerdtfeger, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 09/838,428

(22) Filed: Apr. 19, 2001

(65) Prior Publication Data

US 2002/0156804 A1 Oct. 24, 2002

(51) Int. Cl.
*G06F 17/00* (2006.01)
(52) U.S. Cl. ....................... 715/201; 715/273
(58) Field of Classification Search ............. 715/500.1, 715/526, 516, 515, 514, 730; 707/104.1; 345/581, 418
See application file for complete search history.

(56) References Cited

U.S. PATENT DOCUMENTS

| | | | | |
|---|---|---|---|---|
| 5,692,213 A | | 11/1997 | Goldberg et al. ............ | 395/806 |
| 5,915,256 A | * | 6/1999 | Rogers et al. ............ | 715/501.1 |
| 5,991,780 A | * | 11/1999 | Rivette et al. .............. | 715/512 |
| 6,076,104 A | | 6/2000 | McCue ........................ | 709/219 |
| 6,141,001 A | | 10/2000 | Baleh ........................ | 345/302 |
| 6,243,713 B1 | * | 6/2001 | Nelson et al. ............ | 707/104.1 |
| 6,320,591 B1 | * | 11/2001 | Griencewic .................. | 345/582 |
| 6,363,380 B1 | * | 3/2002 | Dimitrova ...................... | 707/6 |
| 6,569,206 B1 | * | 5/2003 | Dey et al. ................. | 715/501.1 |
| 6,813,618 B1 | * | 11/2004 | Loui et al. ...................... | 707/5 |
| 6,956,573 B1 | * | 10/2005 | Bergen et al. .............. | 345/473 |
| 2002/0054073 A1 | * | 5/2002 | Yuen .......................... | 345/727 |
| 2002/0104096 A1 | * | 8/2002 | Cramer et al. .............. | 725/113 |
| 2004/0078188 A1 | * | 4/2004 | Gibbon et al. ................. | 704/1 |

FOREIGN PATENT DOCUMENTS

| | | |
|---|---|---|
| EP | 0780844 A2 | 6/1997 |
| JP | 10056387 A | 12/1998 |
| JP | 2000-115772 | 4/2000 |

OTHER PUBLICATIONS

Casey, Des, "Learning 'From' or 'Through' the Web: Models of Web Based Education", ACM SIGCSE Bulletin, vol. 30, Issue 3, Aug. 1998, pp. 51-54.*

Mackay, Wendy E., et al, "Virtual Video Editing in Interactive Multimedia Applications", Communications of the ACM, vol. 32, Issue 7, Jul. 1989, pp. 802-810.*

(Continued)

*Primary Examiner*—William L. Bashore
*Assistant Examiner*—Laurie Ries
(74) *Attorney, Agent, or Firm*—Duke W. Yee; Marilyn Smith Dawkins; Mari A. Stewart

(57) ABSTRACT

A method, system, and computer program product for presenting text from multimedia data to a user is provided. In one embodiment, multimedia data containing associated text data is received by a data processing system. The associated text data is extracted from the multimedia data. The associated text data is then outputted without outputting moving images from the multimedia data.

5 Claims, 4 Drawing Sheets

OTHER PUBLICATIONS

Balkir, Nevzat Hurkan, et al, "Delivering Presentations From Multimedia Servers", The VLDB Journal—The International Journal on Very Large Data Bases, vol. 7, Issue 4, Dec. 1998, pp. 294-307.*

Naps, Thomas, et al, "Using the WWW as the Delivery Mechanism for Interactive, Visualization-Based Instructional Modules: Report of the ITiCSE /97 Working Group on Visualization", ACM SIGCUE Outlook, vol. 25, Issue 4, Oct. 1997, pp. 13-26.*

The American Heritage Dictionary, Fourth Edition, Houghton Mifflin Company, 2002, pp. 1269.*

Cruz, Isabel F., et al, "A User-Centered Interface for Querying Distributed Multimedia Databases", ACM SIGMOD Record, vol. 28, Issue 2, Jun. 1999, pp. 590-593.*

Bulterman, Dick C., "Embedded Video In Hypermedia Documents: Supporting Integration and Adaptive Control", ACM Transactions on Information Systems, vol. 13, No. 4, Oct. 1995, pp. 440-470.*

Christel, Michael G., et al, "Interactive Maps for a Digital Video Library", IEEE, Jan.-Mar. 2000, pp. 60-67.*

Cruz, Isabel F., et al, "A User-Centered Interface for Querying Distributed Multimedia Databases", ACM SIGMOD Record, vol. 28, Issue 2, Jun. 1999, pp. 590-593.*

Karshmer et al., *Software Technology and Computer Interfaces for the Disabled: Non-Visual WWW Browsing*, pp. 792-796.

Tolba et al., *Pure Java-Based Streaming MPEG Player*, SPIE vol. 3528, Nov. 1998, pp. 216-224.

IBM Research Disclosure 431191, *Multiple-Search of Video Segments Indexed by Time-Aligned Annotations of Video Content*, Mar. 2000, pp. 603-608.

Koivunen et al., *Accessibility Features of SMIL*, W3C Note 21, Sep. 1999, pp. 1-26.

* cited by examiner

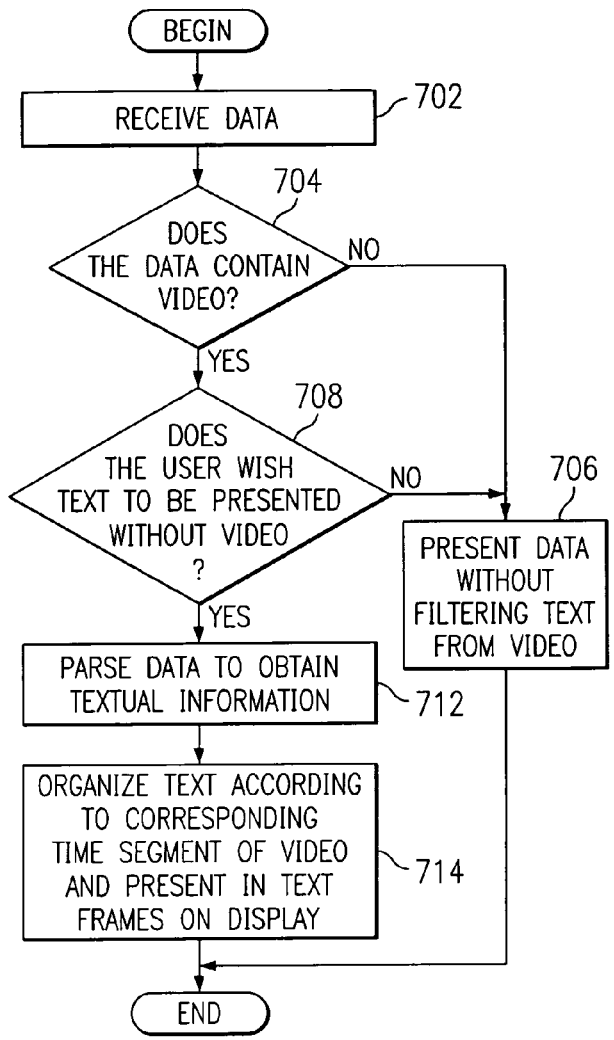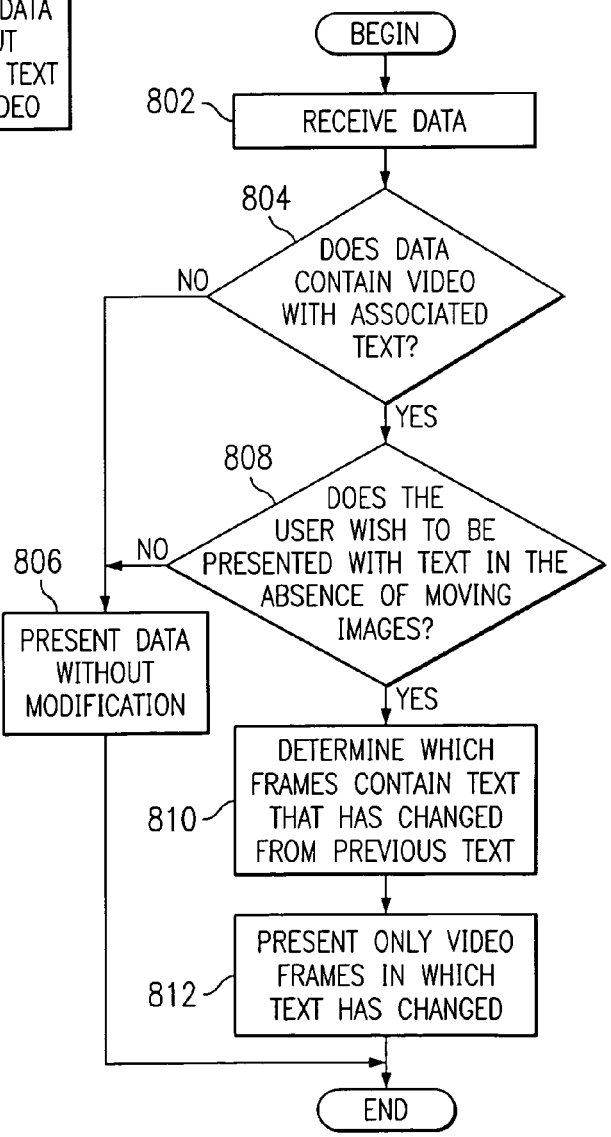

DISPLAYING TEXT OF VIDEO IN BROWSERS ON A FRAME BY FRAME BASIS

BACKGROUND OF THE INVENTION

1. Technical Field

The present invention relates to an improved data processing system and, more particularly, to improved mechanisms for presenting multimedia data to users with disabilities.

2. Description of Related Art

Multimedia presentations rich in text, audio, video, and graphics are becoming more and more common on the Web. They include newscasts, educational material, entertainment, etc. Formats such as SMIL 1.0 can be used to create dynamic multimedia presentations by synchronizing the various media elements in time and space.

However, dynamic multimedia presents a number of challenges to people with disabilities and to authors of accessible content. Authors must provide alternative equivalent content to audio and video so that users with visual or auditory impairments may make use of the presentation. Text content is most valuable to users with a wide range of disabilities, as it may be rendered on the screen, as speech, or on a refreshable braille display. In addition, search engines may process this text content. While there is cost to producing alternative content, the effort may be reduced by using accessible authoring tools.

These alternatives to video and audio content must be synchronized with video and audio tracks. Alternatives that are improperly synchronized may be so confusing as to be unusable. Furthermore, a presentation may occupy multiple sensory channels (eyes, ears, and touch) in parallel. Any content, including alternative content, that is presented to a given sense must be coordinated to ensure that it remains intelligible when rendered with other content meant for that sense. Additionally, the very nature of synchronized multimedia—content changes without user interaction—poses an orientation challenge to some users with blindness, low vision, or cognitive disabilities. These users may still access a presentation as long as the author has provided adequate alternatives and players to allow sufficient control over the presentation.

Therefore, it would be advantageous to have an improved method and apparatus for presenting multimedia data in a manner that is readably understandable and appropriate to the particular disability or product limitations of the user as well as being synchronized to any other content being presented.

SUMMARY OF THE INVENTION

The present invention provides a method, system, and computer program product for presenting text from multimedia data to a user. In one embodiment, multimedia data containing associated text data is received by a data processing system. The associated text data is extracted from the multimedia data. The associated text data is then outputted without outputting moving images from the multimedia data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 depicts a process flow and program function for separating textual information from a video and presenting it to a user in accordance with the present invention; and FIG. 8 depicts a process flow and program function for extracting text from a video source and presenting the text with still images from associated video to a user in accordance with the present invention.

DETAILED DESCRIPTION OF THE PREFERRED EMBODIMENT

Figure 1:
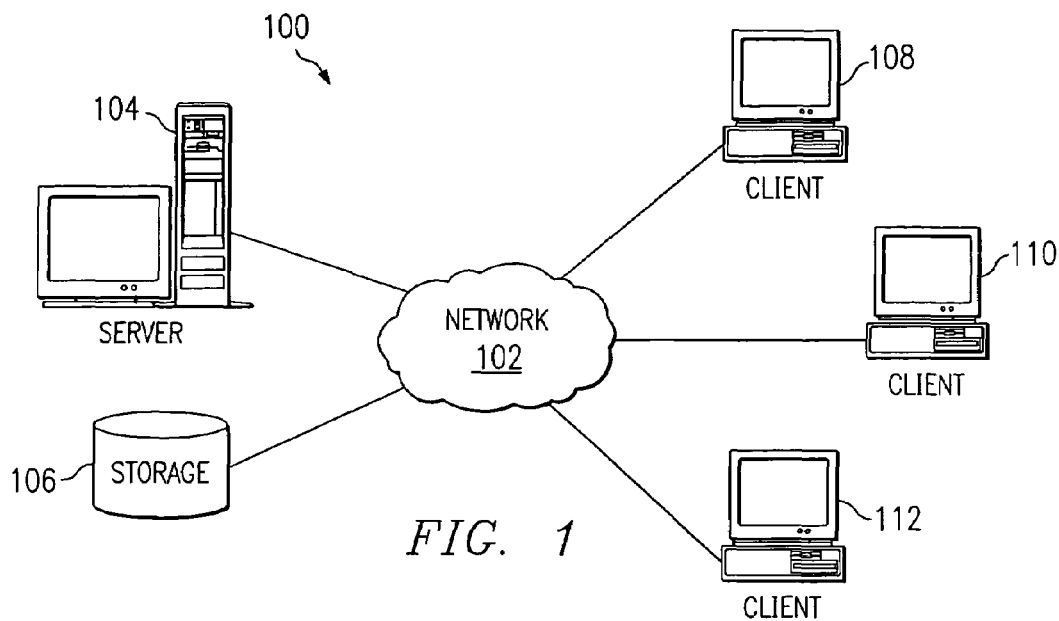
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
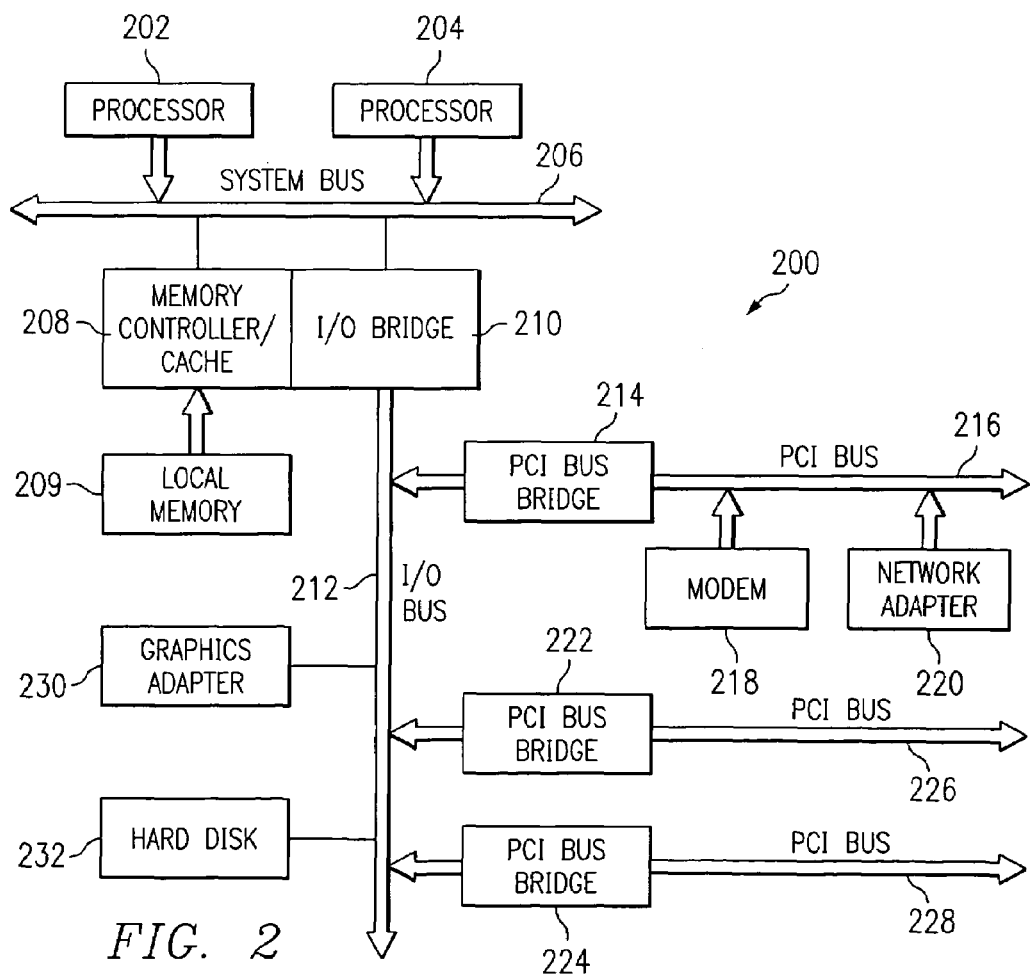
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
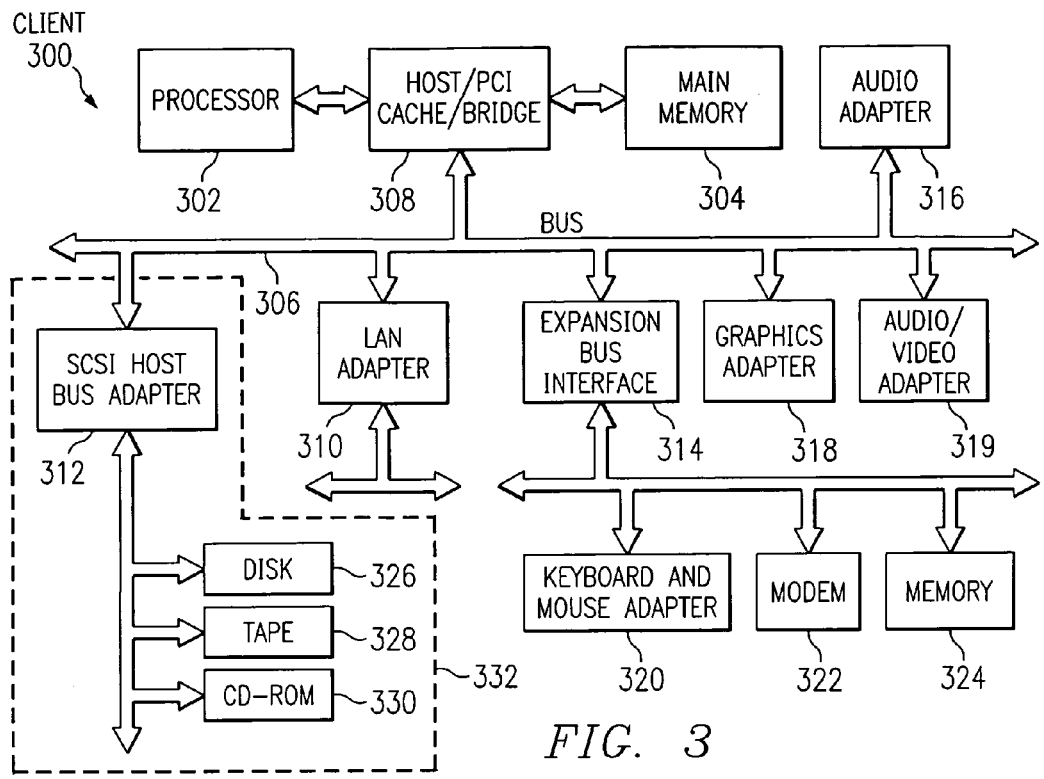
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
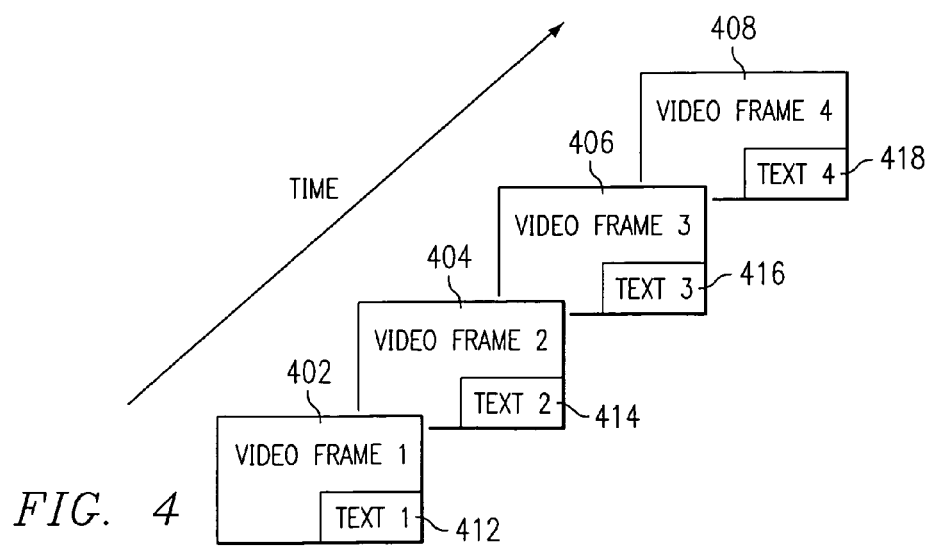
FIG. 4 depicts a block diagram illustrating a prior art method of presenting video, text, and audio to a user.

With reference now to FIG. 4, a block diagram illustrating a prior art method of presenting video, text, and audio to a user is depicted. These frames 402-408 of video may be presented to a user, for example, via broadcast from a server, such as, server 104 in FIG. 1, over a network, such as, for example, network 102 in FIG. 1, to a client computer, such as, for example, client 108 in FIG. 1. Alternatively, the video may be presented to a user using other methods, such as, for example, using cable, satellite, or conventional broadcast television. In the prior art, text 412-418 associated with each frame 402-408 of video is displayed to the user simultaneously with and in the same display area as the video of the frame 402-408. Thus, as the various frames 402-408 are presented to the user sequentially, the text 412-418 may also change with time. For most people, such a method does not pose any problems in ascertaining the contents of the text 412-418. However, for many people who either have difficulty reading quickly enough, difficulty seeing, or difficulty seeing and keeping track of moving images, this method poses significant problems in accurately ascertaining the contents of the text. With the present invention as described below, people with disabilities are able to ascertain information from multimedia sources that would otherwise be unobtainable.

Figure 5:
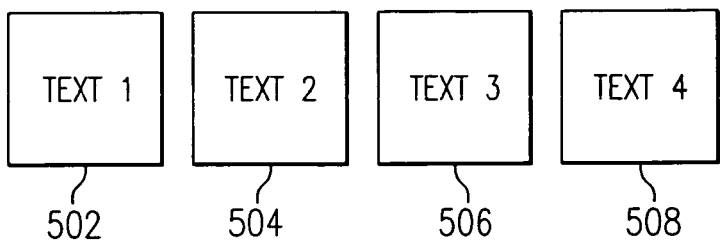
FIG. 5 depicts a block diagram illustrating an exemplary display of textual information corresponding to video frames in accordance with the present invention.

With reference now to FIG. 5, a block diagram illustrating an exemplary display of textual information corresponding to video frames is depicted in accordance with the present invention. The text 412-418 from video frames 402-408 in FIG. 4 has been separated from the video and only the text 412-418 is presented to the user in areas 502-508 while the video portion (animated or moving picture portion) of the video frames 402-408 is discarded.

Alternatively, rather than separating the text 412-418 from the video frames 402-408, a still image of the video frame 402-408 with its associated text 412-418 may be presented to the user in the various areas 502-508. Thus, the areas 502-508 contain both still images and text. Thus, rather than presenting a moving image that is hard for many people to interpret, one or more still images with associated text is presented to the user. Therefore, the user may have the opportunity to read the text at a speed comfortable for the user.

Furthermore, in other embodiments, the video frames 402-408 represent only the frames of video in which text has changed with each of video frames 402-408 separated by one or more intervening video frames in which the images may have changed, but the associated text does not.

Also, rather than presenting the text in several areas 502-508 simultaneously, the text with or without a still image corresponding to the video may be displayed individually and only changed once an indication has been received from the user that the user is ready for the next text. In this manner, the user may control the speed at which text is displayed allowing the user to read the text at a comfortable pace.

Figure 6:
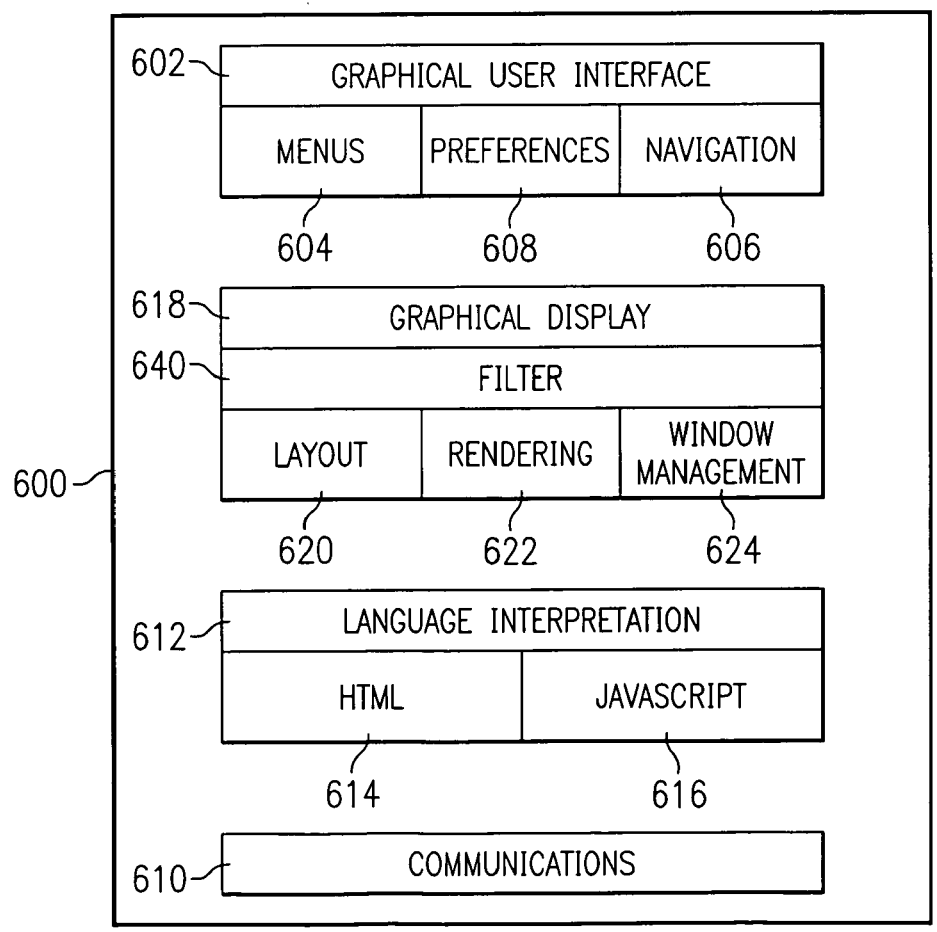
FIG. 6 depicts a block diagram of a browser program in accordance with a preferred embodiment of the present invention.

Turning next to FIG. 6, a block diagram of a browser program is depicted in accordance with a preferred embodiment of the present invention. A browser is an application used to navigate or view information or data in a distributed database, such as the Internet or the World Wide Web.

In this example, browser 600 includes a user interface 602, which is a graphical user interface (GUI) that allows the user to interface or communicate with browser 600. This interface provides for selection of various functions through menus 604 and allows for navigation through navigation 606. For example, menu 604 may allow a user to perform various functions, such as saving a file, opening a new window, displaying a history, and entering a URL. Navigation 606 allows for a user to navigate various pages and to select web sites for viewing. For example, navigation 606 may allow a user to see a previous page or a subsequent page relative to the present page. Preferences such as those illustrated in FIG. 6 may be set through preferences 608.

Communications 610 is the mechanism with which browser 600 receives documents and other resources from a network such as the Internet. Further, communications 610 is used to send or upload documents and resources onto a network. In the depicted example, communication 610 uses HTTP. Other protocols may be used depending on the implementation. Documents that are received by browser 600 are processed by language interpretation 612, which includes an HTML unit 614 and a JavaScript unit 616. Language interpretation 612 will process a document for presentation on graphical display 618. In particular, HTML statements are processed by HTML unit 614 for presentation while JavaScript statements are processed by JavaScript unit 616.

Graphical display 618 includes filter 640, layout unit 620, rendering unit 622, and window management 624. These units are involved in presenting web pages to a user based on results from language interpretation 612. Filter 640 parses data received from the Internet for textual data and, when desired by the user, removes the text from video frames and places the textual data into separate text frames, wherein each text frame may contain textual information from a different video frame and several text frames may be positioned together on a display simultaneously. Thus, a user can take his or her time in reading the text without being bothered by the moving images of the video corresponding to the text.

Browser 600 is presented as an example of a browser program in which the present invention may be embodied. Browser 600 is not meant to imply architectural limitations to the present invention. Presently available browsers may include additional functions not shown or may omit functions shown in browser 600. A browser may be any application that is used to search for and display content on a distributed data processing system. Browser 600 may be implemented using known browser applications, such as Netscape Navigator or Microsoft Internet Explorer. Netscape Navigator is available from Netscape Communications Corporation while Microsoft Internet Explorer is available from Microsoft Corporation.

With reference now to FIG. 7, a process flow and program function for separating textual information from a video and presenting it to a user is depicted in accordance with the present invention. To begin, a user's browser, such as, for example, client 108, receives data from a source, such as, for example, from server 104 via network 102 (step 702). The browser determines whether the data contains video or other moving image data (step 704). If the data does not contain video, then the data are presented to the user in a normal manner consistent with the prior art without using the text filter for filtering text from video content (step 706). If the data does contain video, then the browser determines whether the user has opted to have the text presented without the video (step 708). If the user has not opted to have the text presented with filtering text from the video, then the video and text is presented to the user (step 706).

If the user has opted to have the text presented without the video, then the data is parsed to discover textual information corresponding to the video frames (step 712). The textual information is organized corresponding to a corresponding time portion of the video and is then presented to the user in a separate text frame in the browser display with potentially several text frames present at a given time, wherein each text frame corresponds to a different time portion of the video (step 714).

Optionally, the filter may, upon determining that text from one video frame is identical to text from another video frame, refrain from displaying the same text twice. Furthermore, the text displayed to the user may include text that describes the scene depicted in the video frame that would not otherwise be presented to the user if the video were displayed. This may be obtained, for example, if the author of the video included a textual description of the scenes denoted by tags or other indicia in the data containing the video. The browser, by parsing the data, could obtain this information and present it to the user in the manner described above. Furthermore, the textual information presented in the text frames may include textual description of the audio portion of the video. The textual description of the audio portion may simply be a transcription of the spoken words, or may be a description of the sound, such as, for example, "music playing."

In one embodiment, data may be presented to the browser in the form of a synchronized multimedia integration language (SMIL) in order to allow authors of video content to specify the text to be presented to a user. SMIL is an XML based language very similar to HTML and is a W3C standard authoring language for multimedia documents. By using SMIL, an author can spatially position media elements on the display, synchronize those elements, and display media following user-preferences, such as, for example, language or bit-rate.

Authors can make SMIL 1.0 presentations accessible to people with disabilities by observing the principles discussed in the "Web Content Accessibility Guidelines 1.0". The Guidelines explain how to create documents that account for the diverse abilities, tools, and software of all Web users, including people with combinations of visual, auditory, physical, cognitive, and neurological disabilities. This does not mean creating a great number of separate presentations but rather one integrated and accessible presentation.

By parsing an SMIL document, the filter of the present invention may discover the text that the author wishes to present to the user and may then display this text to the user without the corresponding video. SMIL is merely an example of a language in which authors could use to create multimedia documents for which the filter of the present invention could be applied to present the information in a manner more suitable to certain users. However, other formats could be used as well. Thus, the current invention is not limited to SMIL created documents.

With reference now to FIG. 8, a process flow and program function for extracting text from a video source and presenting the text with still images from associated video to a user is depicted in accordance with the present invention. To begin, data is received (step 802) and a determination is made as to whether the data contains both video and associated text (step 804). If the data does not contain both video and associated text, then the data is presented to the user without modification (step 806).

If the data does contain both video and associated text, a determination is made as to whether the user wishes to be presented with text in the absence of moving images (step 808). If the user does not wish to be presented with text without moving images, then the data is presented to the user without modification (step 806). If the user does wish to have the moving images removed, then a determination is made as to which frames contain text and which text is different from preceding frames (step 810). The user is then presented with only the video frames which contain text that is different from the text in preceding video frames (step 812). This includes video frames that contain text, but that are preceded by video frames that do not contain text and also includes the initial frame of the video if the initial frame contains text. The video frames may be presented to the user several at a time in separate frames as depicted in FIG. 5 or may be presented to the user singly with the next frame displayed at the request of the user. Thus, the text is presented in a manner that allows users who have difficulty processing moving images to comfortably read the text since the images are no longer moving images, but, rather, are still images with associated text.

It is important to note that while the present invention has been described primarily in terms of receiving data at a computer using a browser, the present invention is not limited to such implementation. For example, the present invention may be incorporated into a television to decode text from video in a television presentation and present that text to users in the fashion as discussed above, such that, for example, users who have difficulty viewing video information may nevertheless receive some content from the television program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for presenting text from moving video to a user, the method comprising:

receiving multimedia data containing a plurality of moving video frames and an associated plurality of sets of text data, wherein the associated plurality of sets of text data are associated in time with the plurality of moving video frames, wherein the plurality of sets of text data includes a first text data set associated with a first plurality of moving video frames of the multimedia data, and a second text data set associated with a second plurality of moving video frames of the multimedia data;

extracting the associated plurality of sets of text data from the multimedia data;

extracting a first video frame, from the first plurality of moving video frames, associated with the first text data set to form a first still image;

extracting a second video frame, from the second plurality of moving video frames, associated with the first text data set to form a second still image;

outputting the first text data set in association with the first still image;

outputting the second text data set in association with the second still image;

wherein the step of extracting the associated plurality of sets of text data comprises parsing the multimedia data to determine the first text data set and the first video frame of the first plurality of moving video frames and discarding remaining moving video frames from the first plurality of moving video frames.

2. The method as recited in claim 1, wherein the first text data set and the second text data set are presented in association with the first still image and the second still image, respectively, to the user simultaneously.

3. The method as recited in claim 2, wherein the first text data set and the second text data set are presented in association with the first still image and the second still image, respectively, in separate portions of a static display.

4. The method as recited in claim 1, wherein the first text data set and the second text data set are presented in association with the first still image and the second still image, respectively, to the user individually in a sequential order.

5. The method as recited in claim 4, wherein a next set of text data in the sequential order is presented in response to an indication by the user to display the next set of text data.

* * * * *